(12) United States Patent
Niwa (10) Patent No.: US 9,557,454 B2
(45) Date of Patent: Jan. 31, 2017

(54) LAMINATED DIFFRACTION OPTICAL ELEMENT AND PRODUCTION METHOD THEREFOR

(71) Applicant: CANON KABUSHIKI KAISHA, Tokyo (JP)

(72) Inventor: Maiko Niwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 605 days.

(21) Appl. No.: 13/890,008

(22) Filed: May 8, 2013

(65) Prior Publication Data

US 2013/0301132 A1 Nov. 14, 2013

(30) Foreign Application Priority Data

May 11, 2012 (JP) ................. 2012-109909

(51) Int. Cl.
*G02B 5/18* (2006.01)
*B29D 11/00* (2006.01)

(52) U.S. Cl.
CPC ........... *G02B 5/18* (2013.01); *B29D 11/00769* (2013.01); *G02B 5/1852* (2013.01)

(58) Field of Classification Search
CPC ........... G02B 3/08; G02B 5/18; G02B 5/1814; G02B 5/1842; G02B 5/1866; G02B 5/1871; G02B 5/1876; G02B 2005/1804; G02B 27/42; G02B 27/4205; G02B 27/4233; G02B 27/4238; G02B 27/4288
USPC ................ 359/558, 566, 569–571, 574–576, 359/742–743; 349/193, 201–202; 369/112.03–112.14, 112.2
See application file for complete search history.

(56) References Cited

U.S. PATENT DOCUMENTS

| 6,590,709 | B1 | 7/2003 | Ori | |
| 2003/0112515 | A1* | 6/2003 | Nakabayashi | G02B 5/1866 359/571 |
| 2008/0055736 | A1* | 3/2008 | Tsuji | B29D 11/00432 359/654 |
| 2009/0147363 | A1* | 6/2009 | Murata | B29D 11/0073 359/576 |
| 2009/0195894 | A1 | 8/2009 | Takagi | |
| 2010/0134889 | A1* | 6/2010 | Takayama | G02B 5/1866 359/576 |

(Continued)

FOREIGN PATENT DOCUMENTS

| JP | 5-119202 A | 5/1993 |
| JP | 2000-147226 A | 5/2000 |

(Continued)

OTHER PUBLICATIONS

Machine translation of JP 2007-326330 A.*

*Primary Examiner* — Kimberly N Kakalec
(74) *Attorney, Agent, or Firm* — Canon U.S.A., Inc., IP Division (57) ABSTRACT

A laminated diffraction optical element includes a substrate, and a resin layer provided on the substrate and including an optically effective portion and an optically non-effective outer portion adjacent to the optically effective portion. The optically non-effective outer portion in the resin layer has a continuous shape such that a layer thickness decreases when extending toward an outer periphery of the substrate. An angle formed between a straight line connecting both ends of the continuous shape and a tangent to a surface of the substrate at a point opposite to an end closer to the surface of the substrate is within a range of 20 to 60 degrees.

9 Claims, 7 Drawing Sheets

(56) References Cited

U.S. PATENT DOCUMENTS

2010/0142053 A1* 6/2010 Nakabayashi ....... G02B 5/1852
359/570

FOREIGN PATENT DOCUMENTS

| JP | 2007-212547 A | | 8/2007 |
|---|---|---|---|
| JP | 2007326330 A | * | 12/2007 |
| JP | 2008-119830 A | | 5/2008 |

* cited by examiner

LAMINATED DIFFRACTION OPTICAL ELEMENT AND PRODUCTION METHOD THEREFOR

BACKGROUND OF THE INVENTION

Field of the Invention

The present application relates to a laminated diffraction optical element and a production method therefor, and more particularly, to a method for producing a laminated diffraction optical element for use in an optical apparatus, such as a camera or a video camera, by replica molding using photo-setting resin or thermosetting resin.

Description of the Related Art

Examples of laminated diffraction optical elements molded from photo-setting resin or thermosetting resin are a diffraction optical element, an aspherical lens, and a pickup lens. Replica molding is a typical molding method for these laminated diffraction optical elements. Replica molding includes a step of dropping and supplying resin onto a substrate or a mold having a fine shape, a step of setting the resin by application of energy, and a step of releasing the resin and the substrate together from the mold.

To sufficiently fill the mold with resin in replica molding, for example, a protrusion portion to be filled with squeezing resin is provided on the outer periphery of an optically effective portion of the mold, as disclosed in Japanese Patent Laid-Open No. 5-119202. In the optically effective portion, non-filling is caused, for example, by unevenness in amount of resin dropped on the mold or the substrate and initial misalignment of a lens and the mold. Accordingly, to avoid such non-filling, a generous amount of resin is dropped beforehand to prevent non-filling in the optically effective portion, and a surplus of the resin is supplied in the protrusion portion provided on the outer periphery of the optically effective portion. This allows the optically effective portion to be sufficiently filled with resin so that the resin does not squeeze out of the mold.

However, when resin having low transmittance, for example, resin in which microparticles are dispersed is used in replica molding, a resin layer needs to be uniformly and thinly molded to meet the optical requirement. To be thinly and uniformly molded, the resin needs to be supplied while pressurizing a substrate. When the resin is supplied under pressure, since there is a limit on adjustment of parallelism of axes of the pressed surface, the substrate surface, and the mold surface, the resin is biased according to tilts of the axes. This deteriorates fillability of the resin.

When the technique described in Japanese Patent Laid-Open No. 5-119202 is used to avoid such deterioration of fillability of the resin, the optically effective portion can be sufficiently filled with the resin, but the resin protrusion portion in an optically non-effective outer portion adjacent to the optically effective portion is not uniformly filled with the resin. Further, the roundness of spread resin is seriously decreased by pressurization. As a result, parts filled with resin and parts that are not filled with resin are randomly arranged in the circumferential direction in the protrusion portion of the optically non-effective outer portion. When such a laminated diffraction optical element is mounted in an optical apparatus such as a camera or a video camera, a random filling state in the protrusion portion causes a problem of appearance. Particularly when resin having low transmittance is used, the portions filled with the resin and the portions that are not filled with the resin are easily distinguished because of a great difference in transmittance therebetween. This causes a serious problem from viewpoint of appearance of a product.

SUMMARY OF THE INVENTION

Accordingly, the present disclosure provides a laminated diffraction optical element including a resin layer in which an optically effective portion and a protrusion portion of an optically non-effective outer portion provided to sufficiently fill the optically effective portion with resin are uniformly filled with the resin, and a production method for the laminated diffraction optical element.

A laminated diffraction optical element according to an aspect of the present disclosure includes a substrate, and a resin layer provided on the substrate and including an optically effective portion and an optically non-effective outer portion adjacent to the optically effective portion. The optically non-effective outer portion in the resin layer has a continuous shape such that a layer thickness decreases when extending toward an outer periphery of the substrate. An angle formed between a straight line connecting both ends of the continuous shape and a tangent to a surface of the substrate at a point opposite to an end closer to the surface of the substrate is within a range of 20 to 60 degrees.

A laminated diffraction optical element according to another aspect of the present disclosure includes a substrate, and a resin layer provided on the substrate and including an optically effective portion and an optically non-effective outer portion adjacent to the optically effective portion. The optically non-effective outer portion in the resin layer includes at least a continuous first shape such that a layer thickness decreases when extending toward an outer periphery of the substrate, and a second shape adjacent to the first shape such that the layer thickness increases when extending toward the outer periphery of the substrate. An angle formed between a straight line connecting both ends of the continuous first shape such that the layer thickness decreases and a tangent to a surface of the substrate at a point opposite to an end closer to the surface of the substrate is within a range of 20 to 60 degrees.

A production method for a laminated diffraction optical element according to a further aspect of the present disclosure includes the steps of supplying resin between a substrate and a mold and setting the resin, and separating the mold to form, on the substrate, a resin layer including an optically effective portion and an optically non-effective outer portion adjacent to the optically effective portion. A portion of the mold configured to form the optically non-effective outer portion has a continuous shape such that a mold thickness increases when extending toward an outer periphery. In the step of setting the resin, an angle formed between a straight line connecting both ends of the continuous shape of the mold and a tangent to a surface of the substrate at a point opposite to an end closer to the surface of the substrate is within a range of 20 to 60 degrees.

A production method for a laminated diffraction optical element according to a still further aspect of the present disclosure includes the steps of supplying resin between a substrate and a mold and setting the resin, and separating the mold to form, on the substrate, a resin layer including an optically effective portion and an optically non-effective outer portion adjacent to the optically effective portion. A portion of the mold configured to form the optically non-effective outer portion has at least a continuous first shape such that a mold thickness increases when extending toward an outer periphery and a second shape adjacent to the continuous first shape such that the mold thickness decreases when extending toward the outer periphery. In the step of setting the resin, an angle formed between a straight line connecting both ends of the continuous first shape of the mold such that the mold thickness increases and a tangent to the substrate is within a range of 20 to 60 degrees.

According to the present disclosure, it is at least possible to provide a laminated diffraction optical element including a resin layer in which an optically effective portion and a protrusion portion of an optically non-effective outer portion provided to sufficiently fill the optically effective portion with resin are uniformly filled with the resin, and a production method for the laminated diffraction optical element.

Further features of the present invention will become apparent from the following description of exemplary embodiments with reference to the attached drawings.

DESCRIPTION OF THE EMBODIMENTS

A laminated diffraction optical element according to the present application will be described below.

Figure 1A:
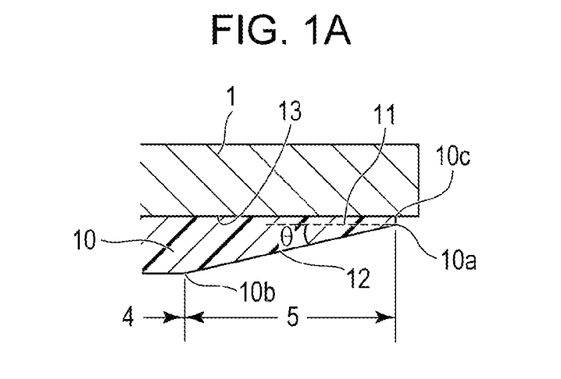
FIGS. 1A to 1C are partial sectional views of optically non-effective outer portions in laminated diffraction optical elements.
Figure 1B:
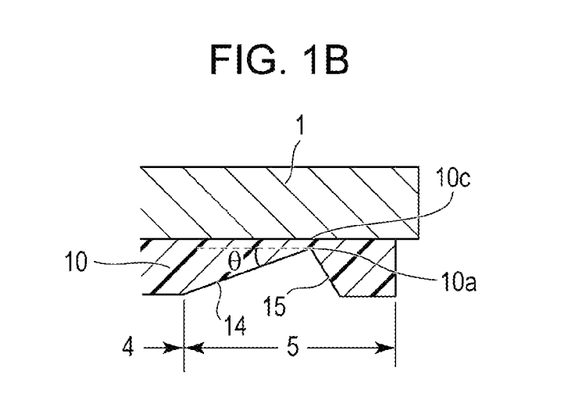
Figure 1C:
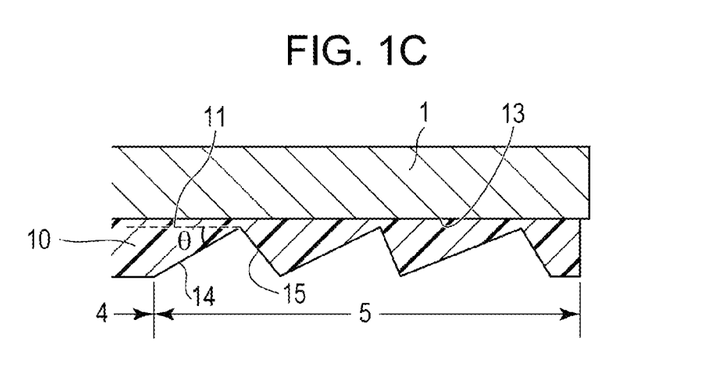

FIGS. 1A to 1C are partial sectional views of optically non-effective outer portions in laminated diffraction optical elements according to embodiments described herein.

A laminated diffraction optical element illustrated in FIG. 1A includes a substrate 1 and a resin layer 10 provided on the substrate 1. The resin layer 10 includes an optically effective portion 4 and an optically non-effective outer portion 5 adjacent to the optically effective portion 4. The optically non-effective outer portion 5 in the resin layer 10 has a continuous shape 12 such that the layer thickness decreases when extending toward an outer periphery of the substrate 1, and an angle θ formed between a straight line connecting both ends 10a and 10b of the continuous shape 12 and a tangent 11 to a substrate surface 13 is within the range of 20 to 60 degrees.

A laminated diffraction optical element illustrated in FIG. 1B includes a substrate 1 and a resin layer 10 provided on the substrate 1. The resin layer 10 includes an optically effective portion 4 and an optically non-effective outer portion 5 adjacent to the optically effective portion 4. The optically non-effective outer portion 5 in the resin layer 10 has at least a continuous first shape 14 such that the layer thickness decreases when extending toward the outer periphery of the substrate 1 and a second shape 15 adjacent to the first shape 14 such that the layer thickness increases toward the outer periphery of the substrate 1. An angle θ formed between a straight line connecting both ends of the continuous first shape 14 and a tangent 11 to a substrate surface at a point 10c opposite to an end 10a closer to the substrate surface is within the range of 20 to 60 degrees. The point 10c opposite to the end 10a closer to the substrate surface is a point on the substrate 1 that is closest to the end 10a.

In a laminated diffraction optical element illustrated in FIG. 1C, an optically non-effective outer portion 5 in a resin layer 10 has a plurality of pairs of a continuous first shape 14 such that the layer thickness decreases when extending toward the outer periphery of a substrate 1 and a second shape 15 adjacent to the first shape 14 such that the layer thickness increases toward the outer periphery of the substrate 1. The number of pairs is within the range of 2 to 10. Referring to FIG. 1, a tangent 11 to a substrate 1 is parallel to a substrate surface 13.

Figure 3:
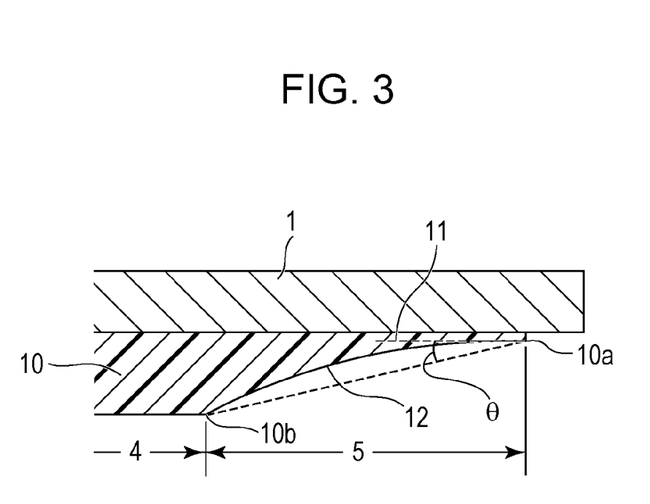
FIG. 3 is a partial sectional view illustrating another shape of the optically non-effective outer portion in the laminated diffraction optical element.

In the present disclosure, preferably, an outer surface of the continuous shape 12 of the optically non-effective outer portion 5 in the resin layer 10 such that the layer thickness decreases has a shape of an inclined face or a curved face. In FIG. 1A, the outer surface of the continuous shape 12 has a shape of an inclined face. FIG. 3 is a partial sectional view illustrating another shape of the optically non-effective outer portion in the laminated diffraction optical element. In FIG. 3, the outer surface of the continuous shape 12 has a shape of a curved face.

The angle θ formed between the straight line connecting both ends 10a and 10b of the continuous shape 12, where the layer thickness decreases when extending toward the outer periphery of the substrate, and the tangent 11 to the substrate surface 13 at the point 10c opposite to the end 10a closer to the substrate surface 13 is preferably within the range of 20 to 60 degrees, and more preferably within the range of 35 to 55 degrees. The straight line connecting both ends 10a and 10b of the continuous shape 12 refers to an inclination line of an inclined face when the continuous shape 12 is formed by the inclined face, as illustrated in FIG. 1A. When the continuous shape 12 is formed by a curved face, as illustrated in FIG. 3, the straight line refers to a straight line connecting an end 10b of an optically non-effective outer portion 5 adjoining an optically effective portion 4 and an end 10a where the layer thickness is the smallest on the outer periphery of the substrate.

For example, the substrate can be formed by a glass or a lens.

For example, the resin layer can be formed of a thermosetting resin or a photo-setting resin. As the thermosetting resin, epoxy resin can be used. As the photo-setting resin, acrylic resin, epoxy resin, and fluororesin can be used.

The resin layer can contain metal microparticles. As the metal microparticles, zinc oxide, indium oxide, tin oxide, antimony oxide, indium oxide doped with tin (hereinafter referred to as "ITO"), tin oxide doped with antimony (ATO), indium oxide doped with zinc (IZO), zinc oxide doped with aluminum (AZO), and tin oxide doped with fluorine (FTO) can be used. Among these, ITO is used preferably.

Preferably, the number-average particle size of the metal microparticles is within the range of 3 to 60 nm.

Next, a production method for the laminated diffraction optical element will be described.

Figure 2A:
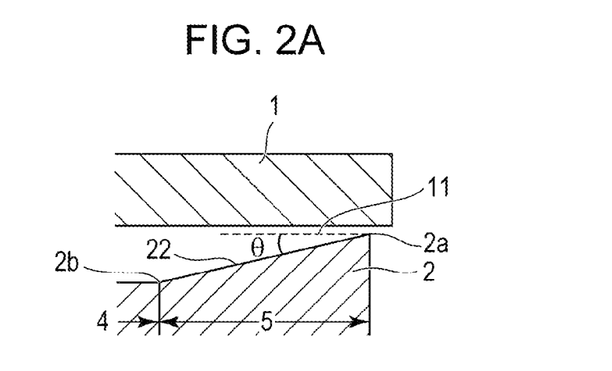
FIGS. 2A to 2C are partial sectional views of molds used in a production method for a laminated diffraction optical element.
Figure 2B:
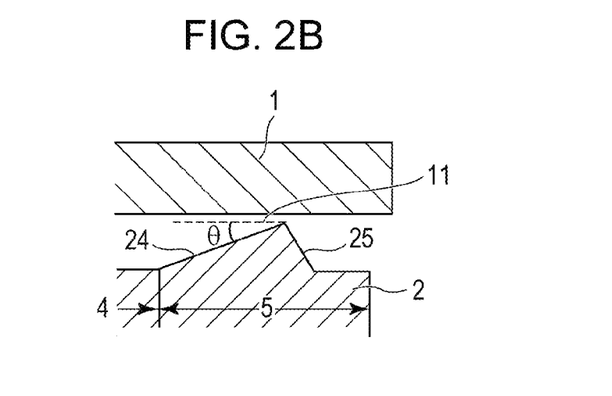
Figure 2C:
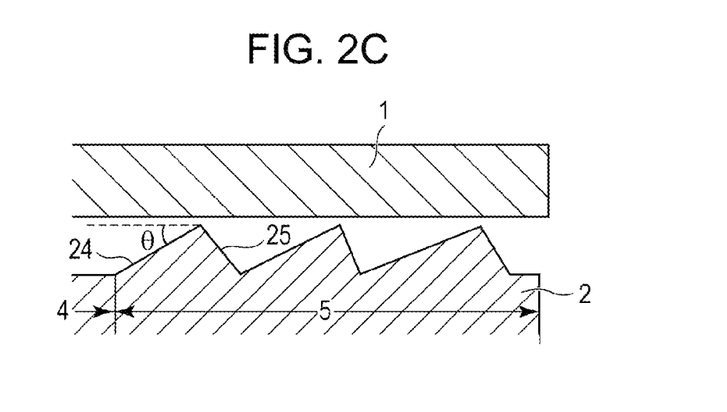

FIGS. 2A to 2C are partial sectional views of molds used in the production method for the laminated diffraction optical element. FIGS. 2A and 2C illustrate examples of optically non-effective outer portions of the molds.

A production method for a laminated diffraction optical element illustrated in FIG. 2A includes a step of supplying resin between a substrate 1 and a mold 2 and setting the resin, and a step of separating the mold 2 to form, on the substrate 1, a resin layer including an optically effective portion 4 and an optically non-effective outer portion 5 adjacent to the optically effective portion. A portion of the mold 2 that forms the optically non-effective outer portion 5 has a continuous shape 22 such that the mold thickness increases when extending toward the outer periphery. In the step of setting the resin, an angle θ formed between a straight line connecting both ends 2a and 2b of the continuous shape 22 and a tangent 11 to a substrate surface at a point opposite to the end 2a closer to the substrate 1 is within the range of 20 to 60 degrees.

A production method for a laminated diffraction optical element illustrated in FIG. 2B includes a step of supplying resin between a substrate 1 and a mold 2 and setting the resin, and a step of separating the mold 2 to form, on the substrate 1, a resin layer including an optically effective portion 4 and an optically non-effective outer portion 5 adjacent to the optically effective portion 4. A portion of the mold 2 that forms the optically non-effective outer portion 5 has at least a continuous first shape 24 such that the mold thickness increases when extending toward the outer periphery and a second shape 25 adjacent to the continuous first shape 24 such that the mold thickness decreases when extending toward the outer periphery. In the step of setting the resin, an angle θ formed between a straight line connecting both ends of the continuous first shape 24, where the mold thickness increases, and a tangent 11 to the substrate 1 is within the range of 20 to 60 degrees.

In a production method for a laminated diffraction optical element illustrated in FIG. 2C, an optically non-effective outer portion 5 of a mold 2 includes a plurality of repetitive pairs of a continuous first shape 24 such that the mold thickness increases when extending toward the outer periphery and a second shape 25 adjacent to the continuous first shape 24 such that the mold thickness decreases when extending toward the outer periphery. The number of pairs is within the range of 2 to 10.

Preferably, an outer surface of the optically non-effective outer portion 5 of the mold 2 opposite to a substrate 1 has a shape of an inclined face or a curved face. Further, an angle θ formed between a straight line connecting both ends of the continuous first shape 24, where the mold thickness decreases, and a tangent to a substrate 1 is preferably within the range of 20 to 60 degrees, and more preferably within the range of 35 to 55 degrees.

In the production method for the laminated diffraction optical element, when the resin is supplied in a protrusion portion provided in the optically non-effective outer portion of the mold, it spreads to turn in the circumferential direction of the substrate. Therefore, fillability of resin in the protrusion portion is enhanced.

When the protrusion portion of the optically non-effective outer portion in the mold has a continuous shape such that the mold thickness increases, as illustrated in FIG. 2A, a reaction force is produced against the resin flowing toward the outer periphery of the substrate. Thus, the resin dominantly spreads in the circumferential direction to a non-filled part of the protrusion portion, and the resin is supplied to the protrusion portion in the form of a true circle. Therefore, in production of a laminated diffraction optical element in which resin needs to be uniformly thinned by pressure, a non-filled part does not remain in the optically effective portion, and the resin is supplied to the optically non-effective outer portion in the form of a true circle. Thus, when the laminated diffraction optical element is mounted in, for example, a camera or a video camera, a serious problem in appearance is not recognized visually.

According to the production method for the laminated diffraction optical element illustrated in FIG. 2B, an advantage similar to that of the shape illustrated in FIG. 2a is found in the continuous first shape 24 in the optically non-effective outer portion of the mold where the mold thickness increases, and resin flows in the circumferential direction of the substrate. Further, since the second shape 25 where the mold thickness decreases is immediately subsequent to the continuous first shape 24 where the mold thickness increases, the resin squeezing out of the continuous first shape 24, where the mold thickness increases, flows in the circumferential direction again in the second shape 25 where the mold thickness decreases. This provides more uniform fillability in the optically non-effective outer portion.

According to the production method for the laminated diffraction optical element illustrated in FIG. 2C, since the pair of the continuous first shape 24, where the mold thickness increases, and the second shape 25 immediately subsequent to the continuous first shape 24 such that the mold thickness decreases is repeated a plurality of times, fillability in the optically non-effective outer portion can be enhanced further. This also sufficiently enhances fillability in the optically non-effective outer portion even in production of a laminated diffraction optical element having a large lens diameter. Moreover, when the number of repetitive pairs is set within the range of 2 to 10, a desired fillability can be achieved without unnecessarily enlarging the optically non-effective outer portion.

In the laminated diffraction optical element, preferably, the optically effective portion in the resin layer is substantially uniformly provided on the substrate. Further, preferably, thickness unevenness of the optically effective portion in the resin layer is less than 10% of the average thickness of the optically effective portion. In this laminated diffraction optical element, it is necessary to fill resin on the substrate in a state in which the layer thickness is uniform. In the step that requires pressurization, fillability can be enhanced in the resin protrusion portion provided in the optically non-effective outer portion.

As the best mode for carrying out the production method for the laminated diffraction optical element, a description will be given below of a method for molding a diffraction optical element by replica molding using a microparticle-dispersed photo-setting resin.

Figure 4A:
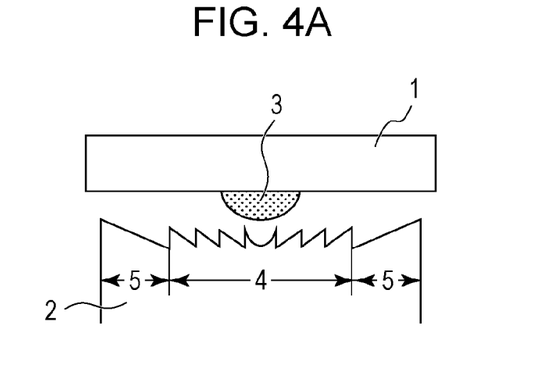
FIGS. 4A to 4C are step views illustrating a production method for a laminated diffraction optical element according to an embodiment disclosed herein.
Figure 4B:
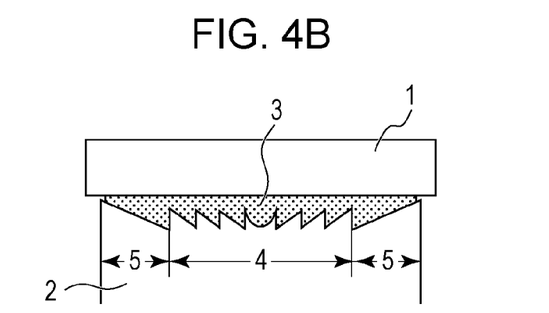
Figure 4C:
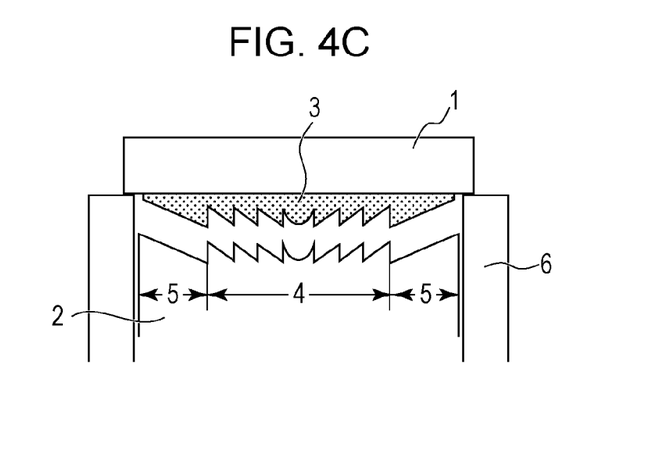

FIGS. 4A to 4C are step views illustrating a production method for a laminated diffraction optical element according to an embodiment disclosed herein. FIGS. 4A to 4C illustrate replica molding for a diffraction optical element. In FIGS. 4A to 4C, a substrate 1 is a lens substrate for molding. A mold 2 has an inverted shape of a desired shape. Reference numeral 3 denotes microparticle-dispersed photo-setting resin, and reference numeral 4 denotes an optically effective portion. An optically non-effective outer portion 5 serves as a resin protrusion portion. An ejector 6 is used to demold the molding lens substrate 1.

First, resin 3 is dropped on a molding surface of the lens substrate 1 for molding, and the lens substrate 1 is placed on the mold 2. Alternatively, the resin 3 is dropped near the center on a molding surface of the mold 2. Further alternatively, after the resin 3 is dropped on both the lens substrate 1 and the mold 2, the lens substrate 1 may be placed on the mold 2 (FIG. 4A). Next, the lens substrate 1 is moved closer to the mold 2 to fill the resin 3 in the mold 2, and the resin 3 is then set (FIG. 4B). As long as the resin 3 is set to a setting degree such as to be releasable from the mold 2, it does not always need to set completely. Finally, the lens substrate 1 for molding is demolded from the mold 2 together with the set resin 3 by raising the lens substrate 1 by the ejector 6 (FIG. 4C).

Here, the used microparticle-dispersed photo-setting resin 3 is obtained by dispersing nano-sized ITO microparticles in photo-setting fluororesin and photo-setting acrylic resin. When the resin is 10 μm in thickness, it has an internal transmittance of about 88% for a wavelength of 587.6 nm. Since the internal transmittance of the resin is low, the resin is required to have a uniform small thickness for use as an optical element in an image pickup system.

To thinly and uniformly fill the resin on the mold, the resin needs to be pressurized by applying force onto an upper surface of the lens substrate. However, if the resin is filled under pressure, the force direction varies owing to the parallelisms of the upper surface of the mold, the surface of the lens substrate, and the pressed surface. Since adjustment of the parallelisms is limited, fillability of the resin becomes significantly uneven.

Figure 5:
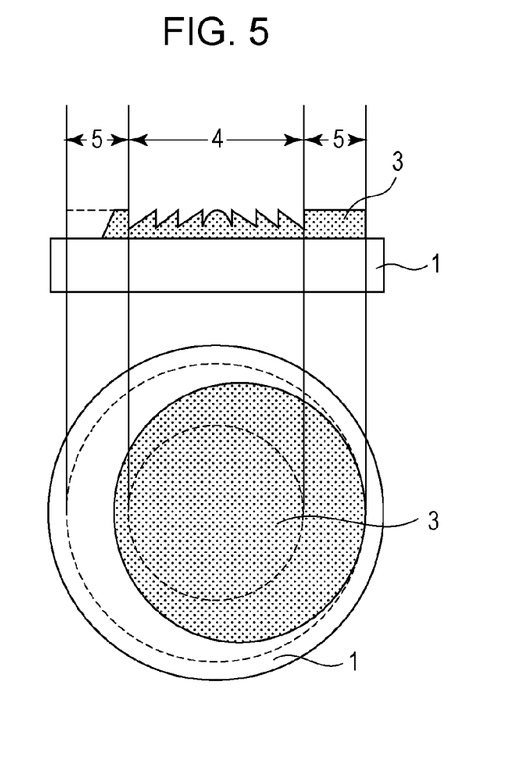
FIG. 5 illustrates an example of a diffraction optical element for comparison with the present disclosure.

If a resin protrusion portion (optically non-effective outer portion) 5 is provided in an optically non-effective outer portion on the mold 2 and an optically effective portion is sufficiently filled by dropping a generous amount of resin in this situation, significant filling unevenness is caused in a resin protrusion portion of a molded diffraction optical element, as illustrated in FIG. 5. FIG. 5 illustrates an example of a diffraction optical element for comparison with an embodiment disclosed herein. Accordingly, filling of the resin in the protrusion portion can be made even by shaping the protrusion portion in the optically non-effective outer portion of the mold into a continuous shape such that the mold thickness increases, as illustrated in FIG. 2A.

Figure 6:
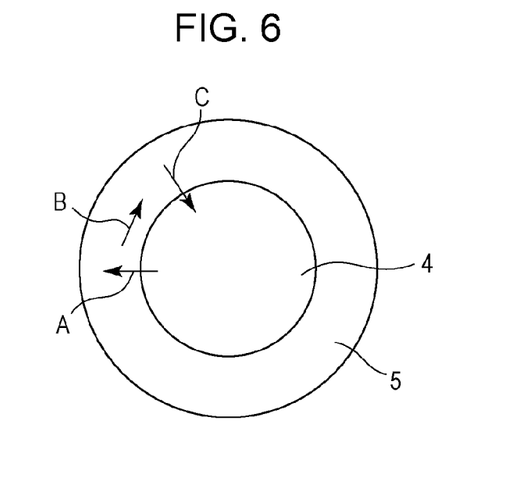
FIG. 6 illustrates a filling state of resin in the optically non-effective outer portion in the production method.

FIG. 6 illustrates a filling state of resin in the optically non-effective outer portion in the production method. In a state in which filling of the resin is uneven, a part of the resin flowing quickly reaches the protrusion portion in the optically non-effective outer portion 5 earlier. The resin reaching the protrusion portion flows into the continuous shape where the layer thickness decreases. Since the flow resistance is increased by the characteristic of this shape, the flow speed of the resin in an outward direction A is reduced. Further, in this case, the flow resistance in a circumferential direction B is lower than the flow resistance in the outward direction A in the protrusion portion, and the resin flows to turn in a radial direction C of the substrate. By this effect, when the resin flowing quickly reaches a certain position of the protrusion portion, it turns in the radial direction C from that position, and flows to cancel filling unevenness due to pressurization.

To increase the flow resistance of the resin in the outward direction, the protrusion portion needs to have a shape such that the layer thickness rapidly decreases. However, if the layer thickness in the protrusion portion too rapidly decreases, a trade-off phenomenon occurs, in which the effect of turning the resin in the radial direction decreases.

A steady state was easily assumed, and the relationship between the layer thickness change in the protrusion portion and fillability was calculated from the relationship between the flow speed of the resin in the outward direction and the turning flow speed. The angle θ formed between the straight line connecting end points of the continuous shape of the protrusion portion 5 of the mold, where the mold thickness increases, and the tangent to the lens substrate was changed, and the lens diameter that allowed the resin to be filled in the form of a true circle even in the optically non-effective outer portion was obtained by calculation. The following Table 1 shows the relationship between the angle θ of the continuous shape of the protrusion portion where the mold thickness increases and the lens diameter that allows filling when the layer thickness in the optically non-effective outer portion is 20 μm.

TABLE 1

| | Angle of continuous shape | | | | | | |
|---|---|---|---|---|---|---|---|
| | 10° | 20° | 30° | 40° | 50° | 60° | 70° 80° |
| Lens diameter for filling [mm] | 4.5 | 10.1 | 15.2 | 22.3 | 22.1 | 11.7 | 6.2 3.9 |

Table 1 shows that, when the angle of the continuous shape is small, the flow resistance of resin in the outward direction does not sufficiently decrease and the lens diameter that allows filling is small. In contrast, when the angle of the continuous shape is too large, the flow resistance of resin in the outward direction decreases, but the effect of turning the resin decreases, and the lens diameter that allows filling is small. To fill the resin in a concentric form in a protrusion portion of a lens having a diameter of 10 mm or more, the angle θ of the continuous shape is preferably within the range of 20 to 60 degrees.

Further, by shaping the protrusion portion in the optically non-effective outer portion 5 such that the portion where the mold thickness decreases is immediately subsequent to the continuous shape where the mold thickness increases, as illustrated in FIG. 2B, the effect of turning the resin in the radial direction can be increased. This is because the resin, which flows through the continuous shape where the mold thickness increases, flows in all directions in the portion where the mold thickness decreases and the turning effect in the radial direction is increased.

By repeating the shape of FIG. 2B, as illustrated in FIG. 2C, it is possible to respond to a case in which filling unevenness is seriously large and a case in which the lens diameter is large.

FIGS. 7A to 7D schematically illustrate a resin filling procedure in the production method, through which fillability of resin is improved. In FIGS. 7A to 7D, a substrate 1 is a lens substrate for molding. A mold 2 has an inverted shape of a desired shape. Reference numeral 3 denotes microparticle-dispersed photo-setting resin. Reference numeral 4 denotes an optically effective portion. An optically non-effective outer portion 5 serves as a resin protrusion portion. A procedure in which fillability of the resin is improved will be described below with reference to the drawings.

Figure 7A:
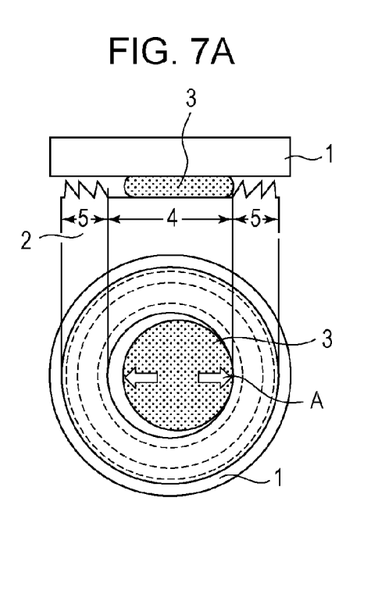
FIGS. 7A to 7D schematically illustrate a resin filling process in the production method.
Figure 7B:
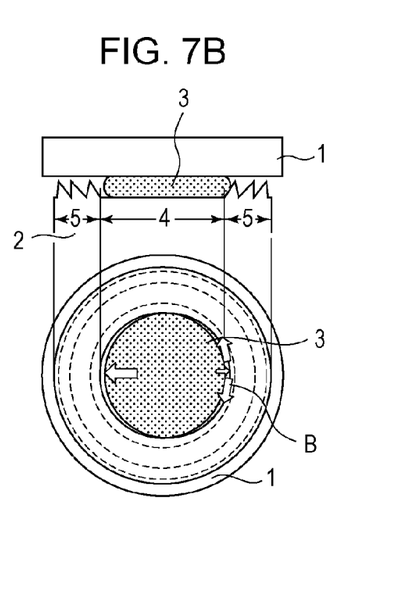

First, as illustrated in FIG. 7A, when the resin 3 is pressurized to become thin and uniform, fillability of the resin 3 deteriorates, and the resin 3 flowing quick reaches the protrusion portion 5. Since the flow resistance in the outward direction A is increased by the continuous shape where the mold thickness increases, the resin, which reaches the protrusion portion, is hindered from being supplied in the outward direction A, and fillability of the resin flowing in the circumferential direction B is improved (FIG. 7B). After that, when the resin passes over the continuous shape where the mold thickness increases, it flows into a portion where the mold thickness decreases, and spreads in all directions.

Figure 7C:
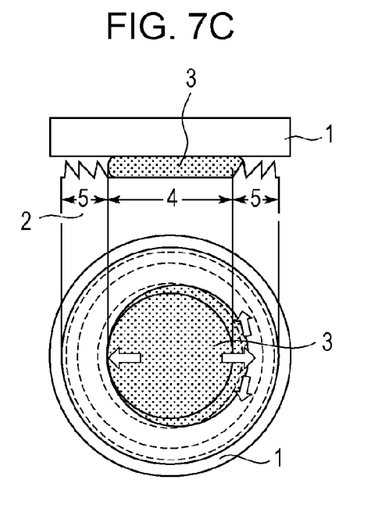
Figure 7D:
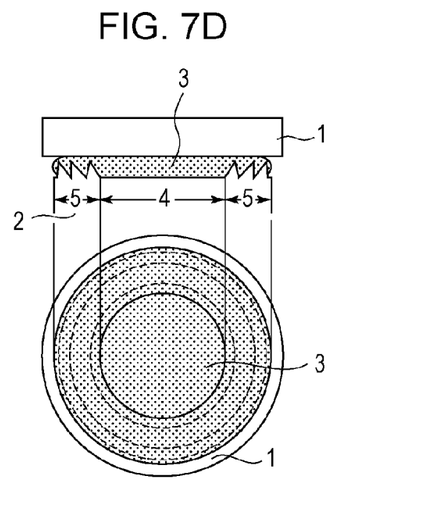

This improves fillability again (FIG. 7C). By repeating this effect a plurality of times, fillability of the resin in the protrusion portion can be sufficiently improved even when the lens diameter is large (FIG. 7D).

In FIGS. 7A to 7D, fillability in a protrusion portion of a lens having a diameter of up to 220 mm can be sufficiently improved by repeating the shape where the mold thickness continuously increases and the subsequent shape where the mold thickness decreases ten times. If the shapes are repeated more than ten times, the length of the optically non-effective outer portion is unnecessarily increased and the lens diameter is increased. Therefore, the number of times the shapes are repeated is preferably within the range of 2 to 10.

EXAMPLES

First Example

A diffraction optical element to be produced in a first example will be described with reference to FIGS. 4A to 4C.

A lens substrate 1 for molding a diffraction optical element is a planar lens having a diameter of 20 mm. Resin 3 is fluororesin in which ITO microparticles are dispersed and has a photo-setting property. Since 20 vol % of nano-sized ITO microparticles are uniformly dispersed in fluororesin, the resin 3 has a dark blue appearance. A grating of a diffraction optical element to be molded is a blazed diffraction grating having a grating height of 9 to 11 μm and a grating width of 0.1 to 10 mm. The grating is concentrically formed, and the optical effective diameter is 18 mm. A mold 2 has an inverted shape of a desired shape of the diffraction grating in an optically effective portion 4 of a molding surface, and a resin protrusion portion 5 in an optically non-effective outer portion. The resin protrusion portion 5 is formed by an inclined face that forms an angle θ of 40 degrees with the lens substrate 1. While the molding surface of the mold 2 is formed by grinding an NiP layer formed as a plated layer on a parent metal, it may be molded with a master mold or polishing a parent material or a plated layer formed on the parent material.

The molding method for the diffraction optical element according to the first example will be described in order.

First, the molding surface of the molding lens substrate 1 is subjected to silane coupling treatment in order to increase adhesion to fluororesin serving as the resin 3 in which ITO microparticles are dispersed. Next, a moderate amount of resin 3 is dropped near the center on the molding surface of the molding lens substrate 1 subjected to silane coupling treatment.

The molding lens substrate 1 is placed on the mold 2 and is pressed with a pressure of 50 kgf (490.3325 N). The molding lens substrate 1 is thereby moved closer to the mold 2 so that the resin 3 is thinly and uniformly filled on the mold 2. Since fluororesin serving as the resin 3, in which ITO microparticles are dispersed, has a dark blue appearance, it needs to be thinly and uniformly spread to a thickness of 2 μm except for a grating portion to increase transmittance.

When the molding lens substrate 1 is pressed, fillability unevenness is caused in the circumferential direction by the difference in parallelism among three surfaces, that is, the lens substrate surface, the surface of the mold, and the pressed surface. When the resin protrusion portion 5 is not shaped like an inclined face, fillability unevenness due to pressurization is not removed. Hence, fillability unevenness in the circumferential direction is large in the resin protrusion portion 5. In contrast, when the resin protrusion portion 5 has an inclined shape such that the mold thickness increases, as in the first example, the resin turns in the circumferential direction, and this enhances fillability in the protrusion portion 5.

The following Table 2 shows the difference in fillability between the protrusion portion that does not have an inclined shape and the protrusion portion of the first example. The angular directions of 0 to 315° in Table 2 represent angles shifted from a certain position of 0° along the lens outer periphery in the circumferential direction. When the protrusion portion does not have an inclined shape, resin is filled in all directions in the optically effective portion (radius of 9.0 mm), but the resin is not filled all around the protrusion portion (radius of 9.0 to 9.5 mm). In the first example, fillability in the protrusion portion is improved by the shape of the protrusion portion of the mold where the mold thickness increases.

TABLE 2

| | | Angular direction | | | |
|---|---|---|---|---|---|
| | | 0° | 45° | 90° | 135° |
| Distance from center of portion filled with resin [mm] | No inclined face | 9.1 | 9.3 | 9.1 | 9.4 |
| | First example | 9.4 | 9.3 | 9.5 | 9.5 |

| | | Angular direction | | | |
|---|---|---|---|---|---|
| | | 180° | 225° | 270° | 315° |
| Distance from center of portion filled with resin [mm] | No inclined face | 9.5 | 9.5 | 9.3 | 9.3 |
| | First example | 9.5 | 9.5 | 9.5 | 9.5 |

Next, the resin 3 filled on the mold is photo-set by irradiation with ultraviolet light from an ultraviolet irradiation lamp (not illustrated), and the set resin 3 is demolded together with the molding lens substrate 1 by raising an ejector 6 relative to the mold 2.

In this way, according to the first example, it is possible to produce a diffraction optical element in which resin is substantially concentrically filled in a resin protrusion portion that is provided to sufficiently fill an optically effective portion with resin. Thus, the diffraction optical element does not have any problem in appearance even when it is visually checked from an optical apparatus on which the diffraction optical element is mounted, such as a camera or a video camera. Therefore, the diffraction optical element can be mounted in the apparatus.

Second Example

FIGS. 8A to 8D are step views illustrating a production method for a laminated diffraction optical element according to a second example. A diffraction optical element to be produced in the second example will be described with reference to FIGS. 8A to 8D.

A diffraction optical element of the second example includes a molding lens substrate 1, epoxy resin 3 in which zirconia oxide (ZrO$_2$) microparticles are dispersed, acrylic resin 7 in which ITO microparticles are dispersed, and a joint lens substrate 8. The molding lens substrate 1 is shaped like a concave lens having a diameter of 60 mm. The resin 3 in which ZrO$_2$ microparticles are dispersed has a photo-setting property. 20 vol % of nano-sized $ZrO_2$ microparticles are uniformly dispersed in the epoxy resin 3, and the epoxy resin 3 is colorless and transparent in appearance. The acrylic resin 7 in which ITO microparticles are dispersed similarly has a photo-setting property. The acrylic resin 7 has a blue appearance because 16 vol % of nano-sized ITO microparticles are uniformly dispersed therein. The joint lens substrate 8 is shaped like a convex lens having a diameter of 55 mm. A diffraction grating between the epoxy resin 3 containing dispersed $ZrO_2$ microparticles and the acrylic resin 7 containing dispersed ITO microparticles is a brazed diffraction grating having a grating height of 10 to 12 μm, a grating width of 0.1 to 2 mm, and a concentric form. An optically effective portion of the grating has a diameter of 51 mm.

Figure 8A:
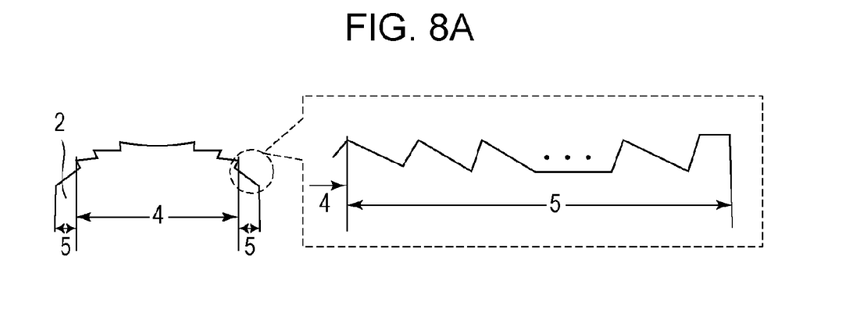
FIGS. 8A to 8D are step views illustrating a production method for a laminated diffraction optical element according to a second example.

A mold 2 used to mold the diffraction optical element of the second example will be described with reference to FIG. 8A. The mold 2 has an inverted shape of a desired shape of a diffraction grating on its molding surface, and is concentrically formed to be convex toward the center. Further, an optically non-effective outer portion of the mold 2 has an inclined face shape where the mold thickness increases. The angle θ formed between the inclined face shape and the substrate surface is 50 degrees. A pair of the inclined face shape and a subsequent shape where the mold thickness decreases is repeated eight times. A molding surface of the mold 2 is formed by cutting Opt-Cu provided as a plated layer on a parent metal.

The production method for the diffraction optical element according to the second example will be described in order.

First, one surface of the molding lens substrate 1 is subjected to silane coupling treatment in order to increase adhesion to the epoxy resin 3 in which $ZrO_2$ microparticles are dispersed. A moderate amount of epoxy resin 3 containing dispersed $ZrO_2$ microparticles is dropped near the center on the surface of the molding lens substrate 1, which is subjected to silane coupling treatment, by a dispenser.

Figure 8B:
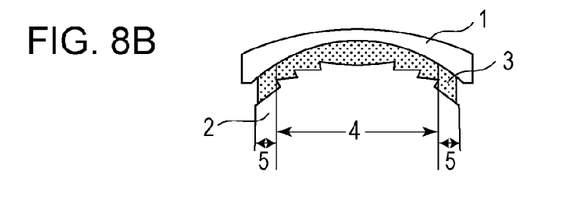
Figure 8C:
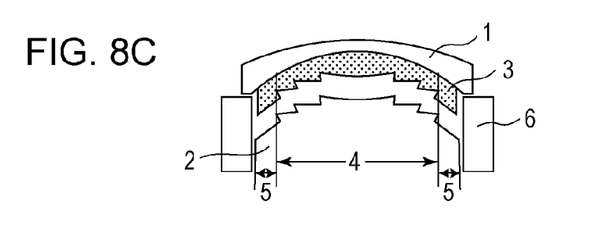

Next, the molding lens substrate 1 is placed on the mold 2, and the epoxy resin 3 containing dispersed $ZrO_2$ microparticles is supplied on the mold 2 (FIG. 8B). The supplied resin 3 containing dispersed $ZrO_2$ microparticles is set by irradiation with ultraviolet light from an ultraviolet irradiation lamp. Further, the set epoxy resin 3 and the molding lens substrate 1 are demolded by an ejector 6, whereby a molded product is obtained. The obtained molded product is shaped to have a desired diffraction surface in an optically effective portion 4 and a resin protrusion portion 5 in an optically non-effective outer portion, as illustrated in FIG. 8C.

Subsequently, one surface of the joint lens substrate 8 is subjected to silane coupling treatment in order to increase adhesion to the acrylic resin 7 in which ITO microparticles are dispersed. A moderate amount of acrylic resin 7 containing dispersed ITO microparticles is dropped near the center on the surface of the joint lens substrate 8, which is subjected to silane coupling treatment, by a dispenser. Alternatively, the acrylic resin 7 containing dispersed ITO microparticles may be dropped near the center of the diffraction grating surface that is molded on the molding lens substrate 1 and formed of the resin 3 containing dispersed $ZrO_2$ microparticles.

Figure 8D:
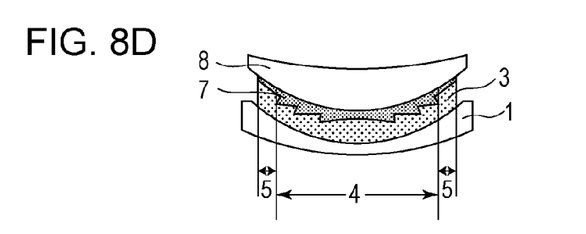

Next, the joint lens substrate 8 placed on the resin 3 containing dispersed $ZrO_2$ microparticles is pressed with a pressure of 300 kgf (2941.995 N), and the acrylic resin 7 containing ITO microparticles is supplied on the joint lens substrate 8 (FIG. 8D). By pressing the joint lens substrate 8 with a pressure of 300 kgf (2941.995 N), the acrylic resin 7 containing dispersed ITO microparticles is uniformly and thinly spread. Since the acrylic resin 7 containing dispersed ITO microparticles has a blue appearance, it needs to be spread to a thickness of 2 μm in order to increase transparency.

When the joint lens substrate 8 is pressed, filling unevenness in the circumferential direction is caused by the difference in parallelism among three surfaces, that is, the joint lens substrate surface, the molding lens substrate surface, and the pressed surface. Particularly when the curvatures of the used lenses are small, filling unevenness is also caused by misalignment of the lenses. Therefore, the filling unevenness is seriously large.

When the resin protrusion portion molded in the optically non-effective outer portion does not have an inclined face shape, filling unevenness due to pressurization is not removed. Hence, filling unevenness in the circumferential direction is large in the resin protrusion portion. In contrast, when the protrusion portion 5 has repetitive inclined face shapes as in the second example, the resin turns in the circumferential direction, and this enhances fillability in the protrusion portion 5.

Fillability of the acrylic resin 7 containing ITO microparticles was compared between the second example and the case in which the protrusion portion did not have the shape such that the inclined faces where the mold thickness increased and decreased are repeated. The distance from the center of the portion filled with the acrylic resin 7 was measured in eight directions. The following Table 3 shows the result of comparison result.

TABLE 3

|  |  | Angular direction | | | |
| --- | --- | --- | --- | --- | --- |
|  |  | 0° | 45° | 90° | 135° |
| Distance from center of portion filled with resin [mm] | No inclined face | 25.6 | 25.5 | 26.4 | 27.0 |
|  | Second example | 27.0 | 27.0 | 26.8 | 26.6 |

|  |  | Angular direction | | | |
| --- | --- | --- | --- | --- | --- |
|  |  | 180° | 225° | 270° | 315° |
| Distance from center of portion filled with resin [mm] | No inclined face | overflow | 27.0 | 26.8 | 25.7 |
|  | Second example | 27.0 | 27.0 | 27.0 | 27.0 |

When the repetitive shape is not provided, the resin is filled all over the optically effective portion (radius of 25.5 mm), but is not filled all over the protrusion portion (radius of 25.5 to 27.0 mm). Also, the resin overflows from the lens in a certain direction. In contrast, in the second example, the resin is turned in the circumferential direction by the effect of the shape of the protrusion portion, and this enhances fillability.

Finally, the acrylic resin 7 containing dispersed ITO microparticles is set by irradiation with ultraviolet light from an ultraviolet irradiation lamp (not illustrated).

In this way, according to the second example, it is possible to produce a diffraction optical element, in which resin is substantially concentrically filled in a resin protrusion portion, even when the resin needs to be thinly and uniformly filled under pressure when joining lenses. Thus, the diffraction optical element does not have any problem in appearance even when it is visually checked from an optical apparatus on which the diffraction optical element is mounted, such as a camera or a video camera. Therefore, the diffraction optical element can be mounted in a product.

Since the laminated diffraction optical element includes the resin layer where the optically effective portion and the optically non-effective outer portion are uniformly filled with resin, it can be used in optical apparatuses such as a camera and a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-109909 filed May 11, 2012, which is hereby incorporated by reference herein in its entirety.

What is claimed is:

1. A laminated diffraction optical element comprising:
    a substrate; and
    a resin layer provided on the substrate and including an optically effective portion and an optically non-effective outer portion adjacent to the optically effective portion,
    wherein the optically non-effective outer portion in the resin layer includes at least a continuous first shape such that a layer thickness decreases when extending toward an outer periphery of the substrate and a second shape, adjacent to the first shape, such that the layer thickness increases when extending toward the outer periphery of the substrate,
    wherein an angle formed between a straight line connecting both ends of the continuous first shape such that the layer thickness decreases and a tangent to a surface of the substrate at a point opposite to an end closer to the surface of the substrate is within a range of 20 to 60 degrees,
    wherein the optically non-effective outer portion in the resin layer includes repetitive pairs of the continuous first shape such that the layer thickness decreases when extending toward the outer periphery of the substrate and the second shape, adjacent to the first shape, such that the layer thickness increases when extending toward the outer periphery of the substrate,
    wherein the number of the repetitive pairs is within a range of 2 to 10, and
    wherein the repetitive pairs are concentrically provided.

2. The laminated diffraction optical element according to claim 1, wherein the resin layer contains indium oxide particles doped with tin.

3. The laminated diffraction optical element according to claim 1, wherein a thickness unevenness of the optically effective portion in the resin layer is less than 10% of an average thickness of the optically effective portion.

4. The laminated diffraction optical element according to claim 1, wherein the resin layer is concentrically provided to the optically effective portion.

5. A production method for a laminated diffraction optical element, comprising the steps of:
    supplying resin between a substrate and a mold;
    filling the mold with the resin;
    setting the supplied resin; and
    separating the mold to form, on the substrate, a resin layer including an optically effective portion and an optically non-effective outer portion adjacent to the optically effective portion,
    wherein a concentric portion of the mold configured to form the optically non-effective outer portion has at least a continuous first shape such that a mold thickness increases when extending toward an outer periphery and a second shape, adjacent to the continuous first shape, such that the mold thickness decreases when extending toward the outer periphery,
    wherein, in the step of supplying the resin, an angle formed between a straight line connecting both ends of the continuous first shape of the mold such that the mold thickness increases and a tangent to the substrate is within a range of 20 to 60 degrees,
    wherein the portion of the mold configured to form the optically non-effective outer portion has repetitive pairs of the continuous first shape such that the layer thickness decreases when extending toward the outer periphery and the second shape, adjacent to the first shape, such that the layer thickness increases when extending toward the outer periphery,
    wherein the number of the repetitive pairs is within a range of 2 to 10, and
    wherein in the step of filling the mold, after the resin is filled in the first shape, the resin is filled in the second shape adjacent to an outside of the first shape.

6. The production method for the laminated diffraction optical element according to claim 5, wherein the resin is supplied while pressure is applied to the substrate in the step of supplying resin.

7. The production method for the laminated diffraction optical element according to claim 5, wherein, in the step of filling the mold, the resin provided in the first shape spreads to turn in a circumferential direction of the substrate.

8. A laminated diffraction optical element comprising:
    a substrate; and
    a resin layer provided on the substrate and including an optically effective portion and an optically non-effective outer portion adjacent to the optically effective portion,
    wherein the optically non-effective outer portion in the resin layer includes at least a continuous first shape such that a layer thickness decreases when extending toward an outer periphery of the substrate and a second shape, adjacent to the first shape, such that the layer thickness increases when extending toward the outer periphery of the substrate,
    wherein the optically non-effective outer portion in the resin layer includes repetitive pairs of the continuous first shape such that the layer thickness decreases when extending toward the outer periphery of the substrate and the second shape, adjacent to the first shape, such that the layer thickness increases when extending toward the outer periphery of the substrate, and
    wherein the number of the repetitive pairs is within a range of 2 to 10.

9. A production method for a laminated diffraction optical element, comprising the steps of:
    supplying resin between a substrate and a mold;
    setting the supplied resin; and
    separating the mold to form, on the substrate, a resin layer including an optically effective portion and an optically non-effective outer portion adjacent to the optically effective portion,
    wherein a portion of the mold configured to form the optically non-effective outer portion has at least a continuous first shape such that a mold thickness increases when extending toward an outer periphery and a second shape, adjacent to the continuous first shape, such that the mold thickness decreases when extending toward the outer periphery, wherein the portion of the mold configured to form the optically non-effective outer portion has repetitive pairs of the continuous first shape such that the layer thickness decreases when extending toward the outer periphery and the second shape, adjacent to the first shape, such that the layer thickness increases when extending toward the outer periphery, and wherein the number of the repetitive pairs is within a range of 2 to 10.

* * * * *